United States Patent
Maruyama

(10) Patent No.: US 9,975,288 B2
(45) Date of Patent: May 22, 2018

(54) CONTROL DEVICE OF INJECTION MOLDING MACHINE HAVING RESIN PURGE FUNCTION

(71) Applicant: FANUC Corporation, Yamanashi (JP)

(72) Inventor: Junpei Maruyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 119 days.

(21) Appl. No.: 15/086,883

(22) Filed: Mar. 31, 2016

(65) Prior Publication Data

US 2016/0288392 A1 Oct. 6, 2016

(30) Foreign Application Priority Data

Apr. 1, 2015 (JP) ................. 2015-075267

(51) Int. Cl.
| | | |
|---|---|---|
| B29C 45/76 | (2006.01) | |
| B29L 31/00 | (2006.01) | |
| B29C 45/17 | (2006.01) | |

(52) U.S. Cl.
CPC ........ B29C 45/762 (2013.01); *B29C 45/1753* (2013.01); *B29C 2945/76561* (2013.01); *B29C 2945/76859* (2013.01); *B29C 2945/76973* (2013.01); *B29L 2031/757* (2013.01)

(58) Field of Classification Search
CPC ...... B29C 45/1753; B29C 2945/76561; B29C 2945/76859; B29C 2945/76973; B29C 45/762
See application file for complete search history.

(56) References Cited

U.S. PATENT DOCUMENTS

2007/0284774 A1* 12/2007 Sandoval ............ B29C 45/1753
264/39

FOREIGN PATENT DOCUMENTS

| CN | 102672928 A | 9/2012 |
|---|---|---|
| CN | 104044241 A | 9/2014 |
| JP | 2-82508 U | 6/1990 |
| JP | 4-93214 A | 3/1992 |
| JP | 9-187847 A | 7/1997 |
| JP | 10-202708 A | 8/1998 |
| JP | 10-272664 A | 10/1998 |
| JP | 2002-307510 A | 10/2002 |
| JP | 2004-98335 A | 4/2004 |

(Continued)

OTHER PUBLICATIONS

Electronic translation of JP 2008-195023 A issued Aug. 28, 2008 retrieved Sep. 22, 2017 (Year: 2017).*

(Continued)

*Primary Examiner* — Jill L Heitbrink
(74) *Attorney, Agent, or Firm* — Hauptman Ham, LLP

(57) ABSTRACT

In a control device of an injection molding machine, an operation mode of a resin purge operation is adjusted so that a plasticization amount index related to a plasticization amount of resin per unit time in the resin purge operation is approximately accorded with a target plasticization amount index which is set. Accordingly, thermal degradation of resin can be prevented, active time from start of a molding operation to completion of a non-defective molded article can be shortened, and production efficiency can be enhanced. Further, the plasticization amount index is not necessarily set by an operator, so that a load on the operator can be reduced as well.

8 Claims, 5 Drawing Sheets

(56) References Cited

FOREIGN PATENT DOCUMENTS

| JP | 2005-246682 A |   | 9/2005  |
|----|---------------|---|---------|
| JP | 2006-88557 A  |   | 4/2006  |
| JP | 2007-223187 A |   | 9/2007  |
| JP | 2008195023 A  | * | 8/2008  |
| JP | 2010-99995 A  |   | 5/2010  |
| JP | 2010-223187 A |   | 10/2010 |

OTHER PUBLICATIONS

Decision to Grant a Patent in JP Patent Application No. 2015-075267, dated Oct. 25, 2016.
Office Action in CN Application No. 201610203705.2, dated Sep. 6, 2017, 13 pp.

* cited by examiner

CONTROL DEVICE OF INJECTION MOLDING MACHINE HAVING RESIN PURGE FUNCTION

RELATED APPLICATIONS

The present application claims priority to Japanese Patent Application No. 2015-075267, filed Apr. 1, 2015, the disclosure of which is hereby incorporated by reference herein in its entirety.

BACKGROUND OF THE INVENTION

1. Field of the Invention

The present invention relates to a control device of an injection molding machine and especially relates to a control device of an injection molding machine having a resin purge function.

2. Description of the Related Art

In an injection molding machine, before a molding operation is started, when a color or a type of resin is replaced to perform molding, or when an operation is resumed after the operation is interrupted, a purge operation in which old resin which remains in an injection cylinder is discharged to be replaced with new resin is performed. Further, after an end of the molding operation as well, an operation in which resin remaining in the injection cylinder is discharged by the purge operation so as to prepare for the next operation is performed.

Further, there is a case in which the purge operation is regularly performed from interruption of the molding operation to resumption of the molding operation. Accordingly, resin remaining in an injection cylinder is prevented from turning yellow or being carbonized due to thermal degradation.

As the purge operation, there is a method in which a screw is rotated while being moved forward and backward by a preset injection stroke so as to repeat plasticization and discharge of resin. At this time, if an interval of the purge operation is large and a purge amount in one purge operation is insufficient, yellowing and carbonization of resin caused by thermal degradation of resin may be generated. Inversely, if an interval of the operation is too small, the purge operation is excessively performed beyond necessity. Accordingly, a consumption amount of resin is increased and production cost may be increased disadvantageously.

In Japanese Patent Application Laid-Open No. 10-272664, a technique related to a purging means which stores a first purging condition for performing normal purging (purge operation) and a second purging condition for performing purging before continuous molding in a memory so as to perform purging in accordance with a purging condition which is read out is disclosed. Further, it is also disclosed that respective purging conditions are preliminarily set and stored in the memory.

In Japanese Patent Application Laid-Open No. 2010-223187, such technique is disclosed that an operation condition corresponding to a molding condition related to molding after start of an operation is set when the operation is started after operation interruption of an injection molding machine and a purge operation for discharging resin in a heating cylinder to the outside in accordance with the operation condition is performed predetermined shot times when the operation is started. Further, it is also disclosed that time of at least one molding cycle in execution of molding in accordance with the molding condition is preliminarily set as the operation condition.

Japanese Patent Application Laid-Open No. 10-272664 and Japanese Patent Application Laid-Open No. 2010-223187 disclose that the purge operation is performed in accordance with the predetermined condition which is preliminarily set. However, the operation condition such as setting time of the purge condition has to be preliminarily set in both cases. Therefore, an operator who is not familiar with the setting operation has difficulty in performing the setting operation and a load of the operation may be imposed even on an operator who is familiar with the setting operation.

SUMMARY OF THE INVENTION

An object of the present invention is to provide a control device of an injection molding machine which is capable of setting a proper purge condition while reducing a load on an operator in setting of a condition of a purge operation so as to prevent thermal degradation of resin.

A control device of an injection molding machine, according to the present invention, is provided which includes an injection cylinder, a screw, a screw forward/backward movement drive unit, a screw position detection unit, a screw rotary drive unit, a screw rotation amount detection unit, and a resin purge control unit which performs a resin purge operation. The resin purge operation is performed by a forward/backward movement operation and a rotation operation of the screw, and the resin purge control unit repeatedly performs the resin purge operation in a predetermined time interval and adjusts an operation mode of the resin purge operation so that a plasticization amount index related to a plasticization amount of resin per unit time in the resin purge operation is approximately accorded with a target plasticization amount index which is set.

Accordingly, thermal degradation of resin can be prevented, active time from start of the molding operation to completion of a non-defective molded article can be shortened, and production efficiency can be enhanced. Further, the plasticization amount index is not necessarily set by an operator, so that a load on the operator can be reduced as well.

The control device of the injection molding machine may further include a plasticization amount index calculation unit which calculates the plasticization amount index, and the target plasticization amount index may be a plasticization amount index which is related to a plasticization amount of resin in a molding operation and is calculated based on either one of a metering stroke and a screw rotation amount of the injection molding machine in the molding operation and cycle time in which one molding cycle in the molding operation is performed.

Accordingly, the operation mode of the resin purge operation is adjusted so that the plasticization amount index related to the plasticization amount of resin per unit time in the molding operation and the plasticization amount index in the resin purge operation are approximately accorded with each other. Therefore, the temperature of melted resin in the molding operation can be approximately equal to the temperature of melted resin in the resin purge operation, thermal degradation of resin can be prevented, active time from start of the molding operation to completion of a non-defective molded article can be shortened, and production efficiency can be enhanced.

The control device of the injection molding machine may further include a setting means which sets the target plasticization amount index, and the target plasticization amount index may be directly inputted by the setting means or selected from candidate values, which are preliminarily stored in the control device, and inputted so as to be set.

Accordingly, even if a metering stroke, a screw rotation amount, and cycle time are undecided before the molding operation is performed, a proper target plasticization amount index corresponding to a type of resin can be set.

The resin purge control unit may adjust at least one of a time interval in which the resin purge operation is performed, a stroke of the screw in the resin purge operation, and a rotation amount of the screw per resin purge operation.

Accordingly, adjustment of the operation mode of the resin purge operation which is controlled by the resin purge control unit can be performed by adjusting any of the time interval in which the resin purge operation is performed, the stroke of the screw, and the rotation amount of the screw.

The resin purge control unit may obtain a stroke ratio which is a ratio between a metering stroke of the injection molding machine in the molding operation and a stroke of the injection molding machine in the resin purge operation and adjust a time interval in which the resin purge operation is performed so that a ratio between cycle time in the molding operation and the time interval in which the resin purge operation is performed is accorded with the stroke ratio.

The resin purge control unit may obtain a rotation amount ratio which is a ratio between a rotation amount of the screw per cycle of the molding operation and a rotation amount of the screw per resin purge operation and adjust a time interval in which the resin purge operation is performed so that a ratio between cycle time in the molding operation and the time interval in which the resin purge operation is performed is accorded with the rotation amount ratio.

Accordingly, even if the stroke or the screw rotation amount in the molding operation is different from the stroke or the screw rotation amount in the resin purge operation, ratios, cycle time, and time intervals in which the resin purge operation is performed in the molding operation and in the resin purge operation are accorded. Accordingly, the plasticization amount index of resin per unit time in the molding operation can be accorded with the plasticization amount index in the resin purge operation and the temperature and the state of melted resin in the molding operation can be accorded with the temperature and the state of melted resin in the resin purge operation as well.

According to the present invention, a control device of an injection molding machine which is capable of setting a proper purge condition while reducing a load on an operator in setting of a condition of a purge operation so as to prevent thermal degradation of resin can be provided.

BRIEF DESCRIPTION OF THE DRAWINGS

The above-described and other objects and features of the present invention will be apparent from the following description of an embodiment in reference to the accompanying drawings. Among these drawings.

DETAILED DESCRIPTION OF THE PREFERRED EMBODIMENTS (First Embodiment)

Figure 1:
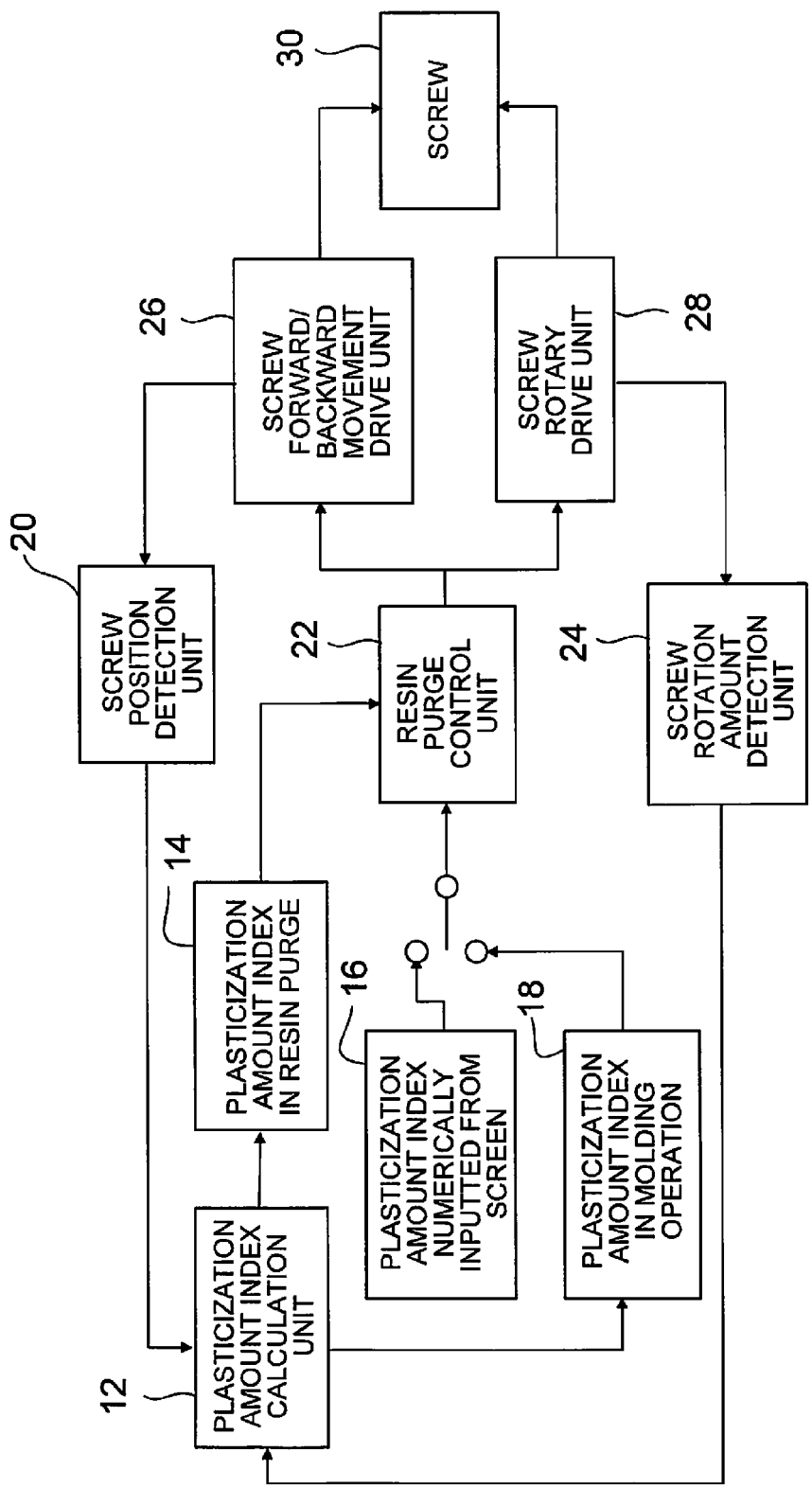
FIG. 1 is a block diagram illustrating the configurations of an injection molding machine and a control device of the injection molding machine according to an embodiment of the present invention.

An embodiment of the present invention is described below with reference to the accompanying drawings. FIG. 1 is a block diagram illustrating the configurations of an injection molding machine and a control device thereof according to the present embodiment. An injection device of the injection molding machine according to the present embodiment is similar to an injection device of a general injection molding machine, so that the injection device of the injection molding machine according to the present embodiment is not especially illustrated. In the injection device, resin stored in a hopper is supplied into an injection cylinder and is conveyed to a direction of a nozzle which is provided to a tip of the injection cylinder by a screw provided inside the injection cylinder. During the conveyance, the resin is heated by a heater which is provided on the periphery of the injection cylinder and the resin inside the injection cylinder is melted by this heating. Then, the melted resin is injected into molds from the nozzle provided to the tip of the injection cylinder. Subsequently, the molds are clamped so as to form a molded article.

In the block diagram of FIG. 1, 30 denotes a screw which is provided inside the injection cylinder and is subjected to drive in the forward and backward movement direction and rotary drive performed by a screw forward/backward movement drive unit 26 and a screw rotary drive unit 28 respectively. The screw forward/backward movement drive unit 26 and the screw rotary drive unit 28 are specifically composed of a servo motor and the like. A position of the screw 30 in the forward/backward movement direction is detected by a screw position detection unit 20 and a rotation amount of the screw 30 is detected by a screw rotation amount detection unit 24.

A position, which is detected by the screw position detection unit 20, of the screw 30 in the forward/backward movement direction and a rotation amount, which is detected by the screw rotation amount detection unit 24, of the screw 30 are inputted into a plasticization amount index calculation unit 12. In the plasticization amount index calculation unit 12, a plasticization amount index which is an index related to a plasticization amount of resin is calculated. Examples of the plasticization amount index include a plasticization amount index 18 in a molding operation and a plasticization amount index 14 in resin purge. A specific calculation method and the like will be described later. A plasticization amount index 16 which is inputted from a screen of a setting means which is not illustrated is calculated from the forward/backward movement position of the screw 30 which is detected by the screw position detection unit 20 and a screw rotation amount which is detected by the screw rotation amount detection unit 24. Any of plasticization amount indices 18 in the molding operation is selected to be inputted into a resin purge control unit 22. The resin purge control unit 22 controls a resin purge operation based on the plasticization amount index 14 in the resin purge and the plasticization amount index 16 which is inputted from the screen or the plasticization amount index 18 in the molding operation. Then, the resin purge control unit 22 outputs a signal to the screw forward/backward movement drive unit 26 and the screw rotary drive unit 28.

Next, a method for adjusting an operation mode of a resin purge operation in the injection molding machine thus configured and the control device of the injection molding machine is described. In the present embodiment, the operation mode of the resin purge operation is adjusted based on a metering stroke in the molding operation.

(1) A plasticization amount index (R1) of resin per unit time is first calculated based on a metering stroke (Xs) corresponding to a volume of resin which is plasticized per cycle and time (Ts) taken for one cycle in the molding operation. The plasticization amount index R1 of resin is an index value related to the plasticization amount of resin per unit time.

$$R1=Xs/Ts$$

(2) Then, an operation period (Tp) of the resin purge operation is calculated based on a stroke (Xp) in the resin purge operation and the plasticization amount index (R1), which is calculated in (1), of resin per unit time. Here, the stroke (Xp) in the resin purge operation may be preliminarily set or set by an operator on a setting screen.

$$Tp=Xp/R1$$

(3) The resin purge operation is repeatedly executed based on the stroke (Xp) in the resin purge operation and the operation period (Tp), which is calculated in (2), of the resin purge operation.

Figure 2:
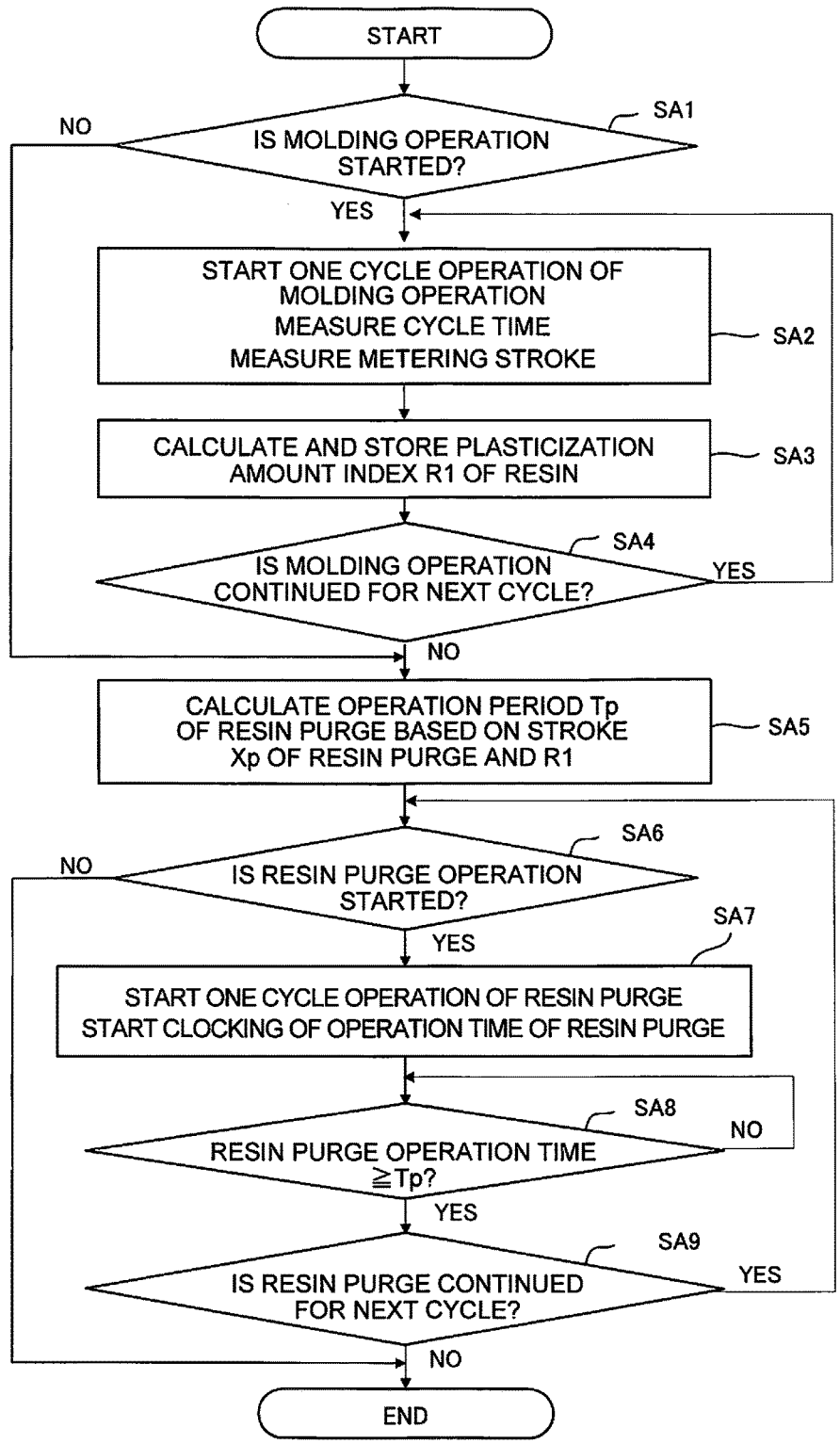
FIG. 2 is a flowchart illustrating a flow of an operation according to a first embodiment of the present invention.

FIG. 2 is a flowchart illustrating a flow of an operation according to the present embodiment. The flow is described step by step below.

(Step SA1) Whether or not the molding operation is started is determined. When the molding operation is started (YES), the process goes to step SA2. When the molding operation is not started (NO), the process goes to step SA5.

(Step SA2) One cycle operation of the molding operation is started and measurement of cycle time and measurement of a metering stroke are performed.

(Step SA3) The plasticization amount index R1 of resin is calculated based on the metering stroke and the cycle time so as to be stored. Specifically, the metering stroke is denoted as Xs and the cycle time is denoted as Ts so as to calculate the plasticization amount index R1 by R1=Xs/Ts.

(Step SA4) Whether or not the molding operation is continued for the next cycle is determined. When the molding operation is continued for the next cycle (YES), the process returns to step SA2. When the molding operation is not continued for the next cycle (NO), the process goes to step SA5.

(Step SA5) The operation period Tp of the resin purge operation is calculated based on the stroke Xp of the resin purge operation and the plasticization amount index R1 of resin which is obtained in step SA3, by Tp=Xp/R1.

(Step SA6) Whether or not an operation of the resin purge operation is started is determined. When the operation of the resin purge operation is started (YES), the process goes to step SA7. When the operation of the resin purge operation is not started (NO), the process is ended.

(Step SA7) The resin purge operation is started and clocking of operation time of the resin purge operation is started.

(Step SA8) Whether or not the resin purge operation time is equal to or longer than the operation period Tp, which is obtained in step SA5, of the resin purge operation is determined. When the resin purge operation time is equal to or longer than the operation period (YES), the process goes to step SA9. When the resin purge operation time is shorter than the operation period (NO), step SA8 is repeated until the resin purge operation time becomes equal to or longer than the operation period.

(Step SA9) Whether or not the resin purge operation is continued for the next cycle is determined. When the resin purge operation is continued for the next cycle (YES), the process returns to step SA6. When the resin purge operation is not continued for the next cycle (NO), the process is ended.

Thus, the resin purge operation is performed based on the stroke Xp, which is set, of the resin purge operation and the operation period Tp, which is calculated, of the resin purge operation. Accordingly, the plasticization amount index of resin per unit time in the resin purge operation can be approximately accorded with a target plasticization amount index (the plasticization amount index of resin per unit time in the molding operation). Consequently, flow of resin per unit time in the resin purge operation and flow of resin per unit time in the molding operation are approximately equal to each other, so that staying time of resin in the injection cylinder and the like in the resin purge operation and staying time and the like in the molding operation become equal to each other. Accordingly, the temperature state of melted resin in the resin purge operation can be made closer to the temperature state in the molding operation.

In a case where a temperature which is measured by a thermometer or the like which is provided to an injection cylinder is made accorded with a target value, it has been conventionally possible to accord the temperature in the resin purge operation with the temperature in the molding operation around a measurement spot. However, in a spot distant from the measurement spot, states of the temperatures or the like have not been always equal to each other due to the flow of resin. In the present embodiment, the plasticization amount index in the resin purge operation and the plasticization amount index in the molding operation are approximately accorded with each other. Therefore, even in a spot distant from the measurement spot, it is possible to keep the states of the temperatures of melted resin or the like in the resin purge operation and in the molding operation equal to each other. Consequently, active time from the start of the molding operation to completion of a non-defective molded article can be shortened and production efficiency can be enhanced.

As the metering stroke, a result value of a stroke from a metering start position to a metering completion position in the molding operation may be measured to be used. As the metering stroke, a result value of a stroke from injection start to injection completion may be measured to be used. As one cycle time, a result value of one cycle time in the molding operation may be measured to be used. As one cycle time, a result value of resin remaining time from metering completion to start of next performance of injection may be measured to be used. As one cycle time, time required for one cycle may be calculated from a mold opening/closing condition, an injection condition, dwelling time, cooling time, and the like so as to be used.

(Second Embodiment)

Instead of the adjustment of the operation mode of the resin purge operation based on a metering stroke in the molding operation in the first embodiment, the operation mode of the resin purge operation is adjusted based on a screw rotation amount in the molding operation in the present embodiment.

(1) A plasticization amount index (R2) of resin per unit time is calculated based on a screw rotation amount (Cs) corresponding to a volume of resin which is plasticized per cycle and time (Ts) taken for one cycle in the molding operation. The plasticization amount index R2 of resin is an index value related to the plasticization amount of resin per unit time.

$$R2=Cs/Ts$$

(2) Then, an operation period (Tp) of the resin purge operation is calculated based on a screw rotation amount (Cp) per resin purge operation and the plasticization amount index (R2), which is calculated in (1), of resin per unit time. Here, the screw rotation amount (Cp) per resin purge operation may be preliminarily set or set by an operator on a setting screen.

$$Tp=Cp/R2$$

(3) The resin purge operation is repeatedly executed based on the screw rotation amount (Cp) per resin purge operation and the operation period (Tp), which is calculated in (2), of the resin purge operation.

Figure 3:
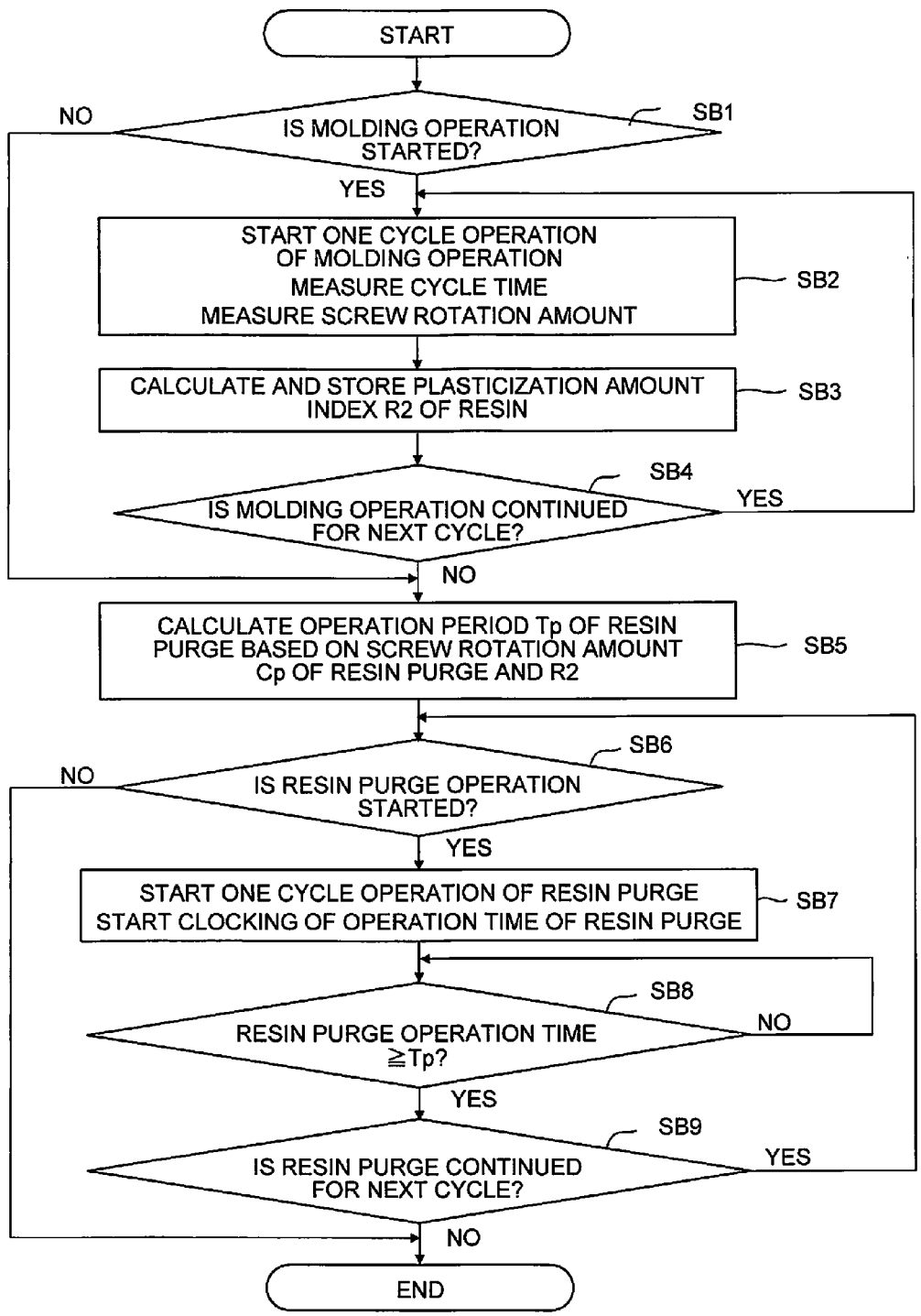
FIG. 3 is a flowchart illustrating a flow of an operation according to a second embodiment of the present invention.

FIG. 3 is a flowchart illustrating a flow of an operation according to the present embodiment. The flow is described step by step below.

(Step SB1) Whether or not the molding operation is started is determined. When the molding operation is started (YES), the process goes to step SB2. When the molding operation is not started (NO), the process goes to step SB5.

(Step SB2) One cycle operation of the molding operation is started and measurement of cycle time and measurement of a screw rotation amount are performed.

(Step SB3) The plasticization amount index R2 of resin is calculated based on the screw rotation amount and the cycle time so as to be stored. Specifically, the screw rotation amount is denoted as Cs and the cycle time is denoted as Ts so as to calculate the plasticization amount index R2 by R2=Cs/Ts.

(Step SB4) Whether or not the molding operation is continued for the next cycle is determined. When the molding operation is continued for the next cycle (YES), the process returns to step SB2. When the molding operation is not continued for the next cycle (NO), the process goes to step SB5.

(Step SB5) The operation period Tp of the resin purge operation is calculated based on the screw rotation amount Cp of the resin purge operation and the plasticization amount index R2 of resin which is obtained in step SB3, by Tp=Cp/R2.

(Step SB6) Whether or not an operation of the resin purge operation is started is determined. When the operation of the resin purge operation is started (YES), the process goes to step SB7. When the operation of the resin purge operation is not started (NO), the process is ended.

(Step SB7) The resin purge operation is started and clocking of operation time of the resin purge operation is started.

(Step SB8) Whether or not the resin purge operation time is equal to or longer than the operation period Tp, which is obtained in step SB5, of the resin purge operation is determined. When the resin purge operation time is equal to or longer than the operation period (YES), the process goes to step SB9. When the resin purge operation time is shorter than the operation period (NO), step SB8 is repeated until the resin purge operation time becomes equal to or longer than the operation period.

(Step SB9) Whether or not the resin purge operation is continued for the next cycle is determined. When the resin purge operation is continued for the next cycle (YES), the process returns to step SB6. When the resin purge operation is not continued for the next cycle (NO), the process is ended.

Thus, the resin purge operation is performed based on the screw rotation amount Cp, which is set, per resin purge operation and the operation period Tp, which is calculated, of the resin purge operation. Accordingly, the plasticization amount index of resin per unit time in the resin purge operation can be approximately accorded with a target plasticization amount index (the plasticization amount index of resin per unit time in the molding operation) in the present embodiment as well. Consequently, flow of resin per unit time in the resin purge operation and flow of resin per unit time in the molding operation are approximately equal to each other, so that staying time of resin in the injection cylinder and the like in the resin purge operation and staying time and the like in the molding operation become equal to each other and states of temperatures of melted resin and the like become equal to each other. Thus, the temperature state of melted resin in the resin purge operation can be made closer to the temperature state in the molding operation.

As the screw rotation amount, a result value of a screw rotation amount from metering start time to metering completion time in the molding operation may be measured to be used. A screw rotation amount may be obtained by integrating a screw rotation speed which is set on a screen of the injection molding machine as a molding condition by measured metering time and used. As the screw rotation amount per resin purge operation, the screw rotation amount may be set from a screen or may be calculated as below by setting the stroke Xp, the screw rotation speed Vrot, and the screw retracting speed Vbck of the resin purge operation from the screen and used.

$$Cp=Vrot\times Xp/Vbck$$

(Third Embodiment)

In the present embodiment, the operation mode of the resin purge operation is adjusted based on a set value set by a setting means and a stroke of the resin purge operation.

(1) A plasticization amount index (R3) of resin per unit time is first set from a screen of the setting means or the like.

(2) Then, an operation period (Tp) of the resin purge operation is calculated based on a stroke (Xp) in the resin purge operation and the plasticization amount index (R3), which is set in (1), of resin per unit time. Here, the stroke (Xp) in the resin purge operation may be preliminarily set or set by an operator on a setting screen.

$$Tp=Xp/R3$$

(3) The resin purge operation is repeatedly executed based on the stroke (Xp) in the resin purge operation and the operation period (Tp), which is calculated in (2), of the resin purge operation.

Figure 4:
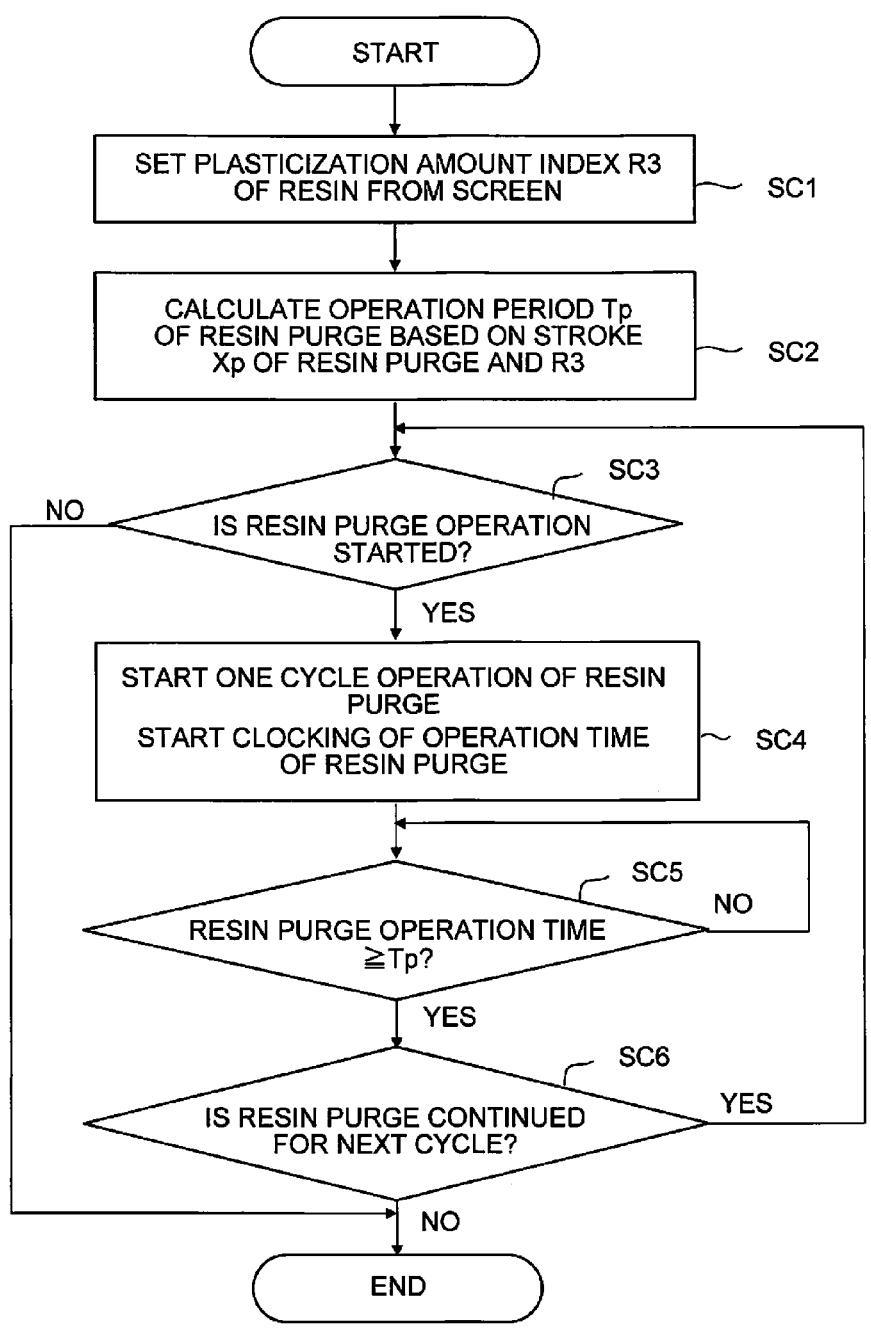
FIG. 4 is a flowchart illustrating a flow of an operation according to a third embodiment of the present invention.

FIG. 4 is a flowchart illustrating a flow of an operation according to the present embodiment. The flow is described step by step below.

(Step SC1) The plasticization amount index R3 of resin is set from the screen or the like of the setting means.

(Step SC2) The operation period Tp of the resin purge operation is calculated based on the stroke Xp of the resin purge operation and the plasticization amount index R3 of resin which is set in step SC1, by Tp=Xp/R3.

(Step SC3) Whether or not an operation of the resin purge operation is started is determined. When the operation of the resin purge operation is started (YES), the process goes to step SC4. When the operation of the resin purge operation is not started (NO), the process is ended.

(Step SC4) The resin purge operation is started and clocking of operation time of the resin purge operation is started.

(Step SC5) Whether or not the resin purge operation time is equal to or longer than the operation period Tp, which is obtained in step SC2, of the resin purge operation is determined. When the resin purge operation time is equal to or longer than the operation period (YES), the process goes to step SC6. When the resin purge operation time is shorter than the operation period (NO), step SC5 is repeated until the resin purge operation time becomes equal to or longer than the operation period.

(Step SC6) Whether or not the resin purge operation is continued for the next cycle is determined. When the resin purge operation is continued for the next cycle (YES), the process returns to step SC3. When the resin purge operation is not continued for the next cycle (NO), the process is ended.

Thus, the resin purge operation is performed based on the stroke Xp, which is set, of the resin purge operation and the operation period Tp, which is calculated, of the resin purge operation. Accordingly, the plasticization amount index of resin per unit time in the resin purge operation can be approximately accorded with a target plasticization amount index. Consequently, flow of resin per unit time, staying time of resin in the injection cylinder, a state of a temperature and the like of melted resin in the resin purge operation can be made be a proper state corresponding to a type of resin.

(Fourth Embodiment)

In the present embodiment, the operation mode of the resin purge operation is adjusted based on a set value set by a setting means and a screw rotation amount of the resin purge operation.

(1) A plasticization amount index (R4) of resin per unit time is first set from a screen of the setting means or the like.

(2) Then, an operation period (Tp) of the resin purge operation is calculated based on a screw rotation amount (Cp) per resin purge operation and the plasticization amount index (R4), which is set in (1), of resin per unit time. Here, the screw rotation amount (Cp) per resin purge operation may be preliminarily set or set by an operator on a setting screen.

$$Tp=Cp/R4$$

(3) The resin purge operation is repeatedly executed based on the screw rotation amount (Cp) per resin purge operation and the operation period (Tp), which is calculated in (2), of the resin purge operation.

Figure 5:
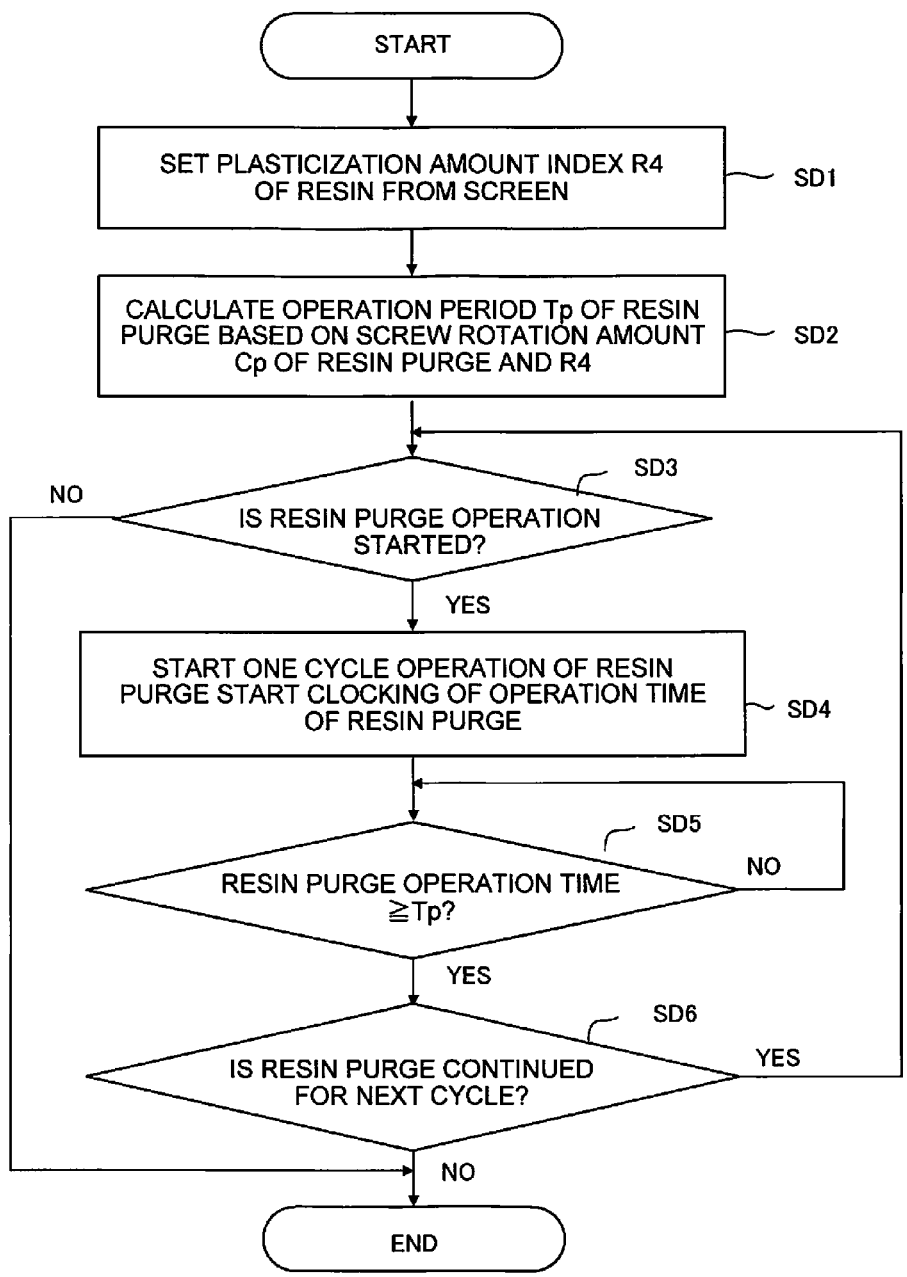
FIG. 5 is a flowchart illustrating a flow of an operation according to a fourth embodiment of the present invention.

FIG. 5 is a flowchart illustrating a flow of an operation according to the present embodiment. The flow is described step by step below.

(Step SD1) The plasticization amount index R4 of resin is set from the screen or the like of the setting means.

(Step SD2) The operation period Tp of the resin purge operation is calculated based on the screw rotation amount Cp per resin purge operation and the plasticization amount index R4 of resin which is set in step SD1, by Tp=Cp/R4.

(Step SD3) Whether or not an operation of the resin purge operation is started is determined. When the operation of the resin purge operation is started (YES), the process goes to step SD4. When the operation of the resin purge operation is not started (NO), the process is ended.

(Step SD4) The resin purge operation is started and clocking of operation time of the resin purge operation is started.

(Step SD5) Whether or not the resin purge operation time is equal to or longer than the operation period Tp, which is obtained in step SD2, of the resin purge operation is determined. When the resin purge operation time is equal to or longer than the operation period (YES), the process goes to step SD6. When the resin purge operation time is shorter than the operation period (NO), step SD5 is repeated until the resin purge operation time becomes equal to or longer than the operation period.

(Step SD6) Whether or not the resin purge operation is continued for the next cycle is determined. When the resin purge operation is continued for the next cycle (YES), the process returns to step SD3. When the resin purge operation is not continued for the next cycle (NO), the process is ended.

Thus, the resin purge operation is performed based on the screw rotation amount Cp, which is set, per resin purge operation and the operation period Tp, which is calculated, of the resin purge operation. Accordingly, the plasticization amount index of resin per unit time in the resin purge operation can be approximately accorded with a target plasticization amount index in the present embodiment as well. Consequently, flow of resin per unit time, staying time of resin in the injection cylinder, a state of a temperature and the like of melted resin in the resin purge operation can be made be a proper state corresponding to a type of resin.

Here, set values and result values required for calculation of operation conditions of the resin purge operation may be stored in the control device together with molding conditions and a stored value may be also read in reading of the molding condition so as to calculate an operation condition of the resin purge operation.

The invention claimed is:

1. A control device of an injection molding machine, comprising:
    an injection cylinder;
    a screw;
    a screw forward/backward movement drive unit;
    a screw position detection unit;
    a screw rotary drive unit;
    a screw rotation number detection unit; and
    a resin purge control unit which performs a resin purge operation; wherein
    the resin purge operation is performed through a forward/backward movement operation and a rotation operation of the screw, and
    the resin purge control unit repeatedly performs the resin purge operation in a predetermined time interval and adjusts an operation mode of the resin purge operation so that a plasticization amount index related to a plasticization amount of resin per unit time in the resin purge operation is approximately accorded with a target plasticization amount index which is set.

2. The control device of the injection molding machine according to claim 1, further comprising:
a plasticization amount index calculation unit which calculates the plasticization amount index; wherein
the target plasticization amount index is a plasticization amount index which is related to a plasticization amount of resin in a molding operation and is calculated based on either one of a metering stroke and a screw rotation number of the injection molding machine in the molding operation, or cycle time in which one molding cycle in the molding operation is performed.

3. The control device of the injection molding machine according to claim 1, further comprising:
a setting means which sets the target plasticization amount index; wherein
the target plasticization amount index is directly inputted by the setting means or selected from candidate values, the candidate values being preliminarily stored in the control device, and inputted so as to be set.

4. The control device of the injection molding machine according to claim 1, wherein the resin purge control unit adjusts at least one of a time interval in which the resin purge operation is performed, a stroke of the screw in the resin purge operation, and a rotation number of the screw per resin purge operation.

5. The control device of the injection molding machine according to claim 1, wherein the resin purge control unit obtains a stroke ratio which is a ratio between a metering stroke of the injection molding machine in the molding operation and a stroke of the injection molding machine in the resin purge operation and adjusts a time interval in which the resin purge operation is performed so that a ratio between cycle time in the molding operation and the time interval in which the resin purge operation is performed is accorded with the stroke ratio.

6. The control device of the injection molding machine according to claim 1, wherein the resin purge control unit obtains a rotation number ratio which is a ratio between a rotation number of the screw per cycle of the molding operation and a rotation number of the screw per resin purge operation and adjusts a time interval in which the resin purge operation is performed so that a ratio between cycle time in the molding operation and the time interval in which the resin purge operation is performed is accorded with the rotation number ratio.

7. The control device of the injection molding machine according to claim 1, further comprising:
a plasticization amount index calculation unit which calculates the plasticization amount index, wherein the plasticization amount index is calculated based on
a metering stroke corresponding to a volume of resin which is plasticized per molding cycle, and
time taken for one cycle in the molding operation.

8. The control device of the injection molding machine according to claim 1, further comprising:
a plasticization amount index calculation unit which calculates the plasticization amount index, wherein the plasticization amount index is calculated based on
a screw rotation amount corresponding to a volume of resin which is plasticized per molding cycle, and
time taken for one cycle in the molding operation.

* * * * *